Patented June 20, 1933

1,914,969

UNITED STATES PATENT OFFICE

RALPH N. CHIPMAN, OF BOUND BROOK, NEW JERSEY, ASSIGNOR TO CHIPMAN CHEMICAL COMPANY, INC., OF BOUND BROOK, NEW JERSEY, A CORPORATION OF NEW YORK

PULVERULENT HERBICIDE AND DUSTING METHOD

No Drawing.   Application filed July 20, 1928.   Serial No. 294,324.

This invention relates to a pulverulent herbicide, a process of making it and also a dusting method of killing weeds.

It was discovered in France, some years ago, that a solution of sodium-chlorate possessed herbicidal properties equal to those of sodium arsenite without, however, being poisonous to animal life. Its usage had the marked danger, however, of incurring pronounced fire-hazards; notwithstanding that it was always applied in the form of a dilute solution.

In fact, in all chemical weed-killing operations, it has been the universal practice to dissolve the agent in water. This was deemed essential because it is in a state of solution that chemical reactions take place effectively; either on account of the intimacy of association or because of the ionizing of the material.

For major operations, such as in clearing a railway that has rankly overgrown, it is quite practicable to apply the agent in the form of a solution. It was shipped in a concentrated form and diluted for usage on the field of operations. This of course involved an undesirable expense in freight charges to cover the weight of the transported water, and of course increased the cost of the containers. In such cases, furthermore, special equipment of a rather elaborate nature was required in view of the extensive mileage being sprayed by a continuous run; the liquid agent being diluted at stations where larger supplies of water could be had, and the diluted solution being carried along the track in one or more tank cars and sprayed during its haulage over the weed-grown regions.

But, after the rank growths have been eliminated, a certain amount of minor growths may reasonably be expected to follow the major operation, either later in the same year, or as a sparse growth during the next year, according to conditions. The minor growths are very often too scattering to justify the expense of hauling tank-cars and power-operated sprayers. These minor growths should be taken care of by section-gangs who are responsible for the maintenance of their particular sections.

For them to do this work manually means that the section foreman would have to dilute the concentrated solution in which the agent comes to him, and then apply it by a sprinkling can or the like; all of which involves much trouble. Sometimes, furthermore, but little water is available along given sections and the gang is therefore obliged to expend much time and effort from that cause.

For household and minor domestic operations, it also put the user to the trouble of measuring and mixing solutions, and to the need for spraying equipment; not to mention the likelihood of soiling garments when sprinkling weeds with a solution.

However there appeared to be no way of avoiding these annoyances for it was deemed essential that the material be applied in the form of an aqueous solution to be effective.

Of late, I have made efforts to discover a remedy for these difficulties by seeking what may be termed a dry or dusting process. Even if the sodium chlorate could be obtained in a dry form, it is an active source of oxygen and, if dusted on weeds, or even handled as such, would constitute a great fire-hazard. Furthermore, its herbicidal efficiency would be too low to be economical. In fact, the outstanding defect of a solution of sodium chlorate is that it will dry out in contact with organic material sufficiently to convert it into a highly combustible, if not actually explosive, status.

It was in attempting to overcome this fire-hazard that I was led to the discovery that the chlorate of an alkaline-earth base (such as of calcium, magnesium, etc.) was even more effective in the form of a solution as a weed-killer and yet quite avoided the fire-hazard. This discovery was disclosed by me in my United States Patent No. 1,694,205 which also set forth and claimed that novel herbicidal agent, also an inexpensive way of making that solution, and also the new method of eradicating weeds by spraying the leaves with a solution of the agent.

I have now made another discovery of importance in this industry; to wit, that if sodium-chlorate (which is commercially available as a moist salt) be simply well mixed with a sufficient amount of calcined calcium chloride, then can a dry powder be readily obtained.

Having thus obtained a dry powdery mixture containing an alkaline chlorate associated with an alkaline-earth chloride as an essential element for the first time, I was led to further experiments to ascertain if it, as such, possessed herbicidal properties, and if so whether, as such, it could be used to advantage by a householder or other local operator, by a dusting application. These experiments demonstrated the fact, to wit, that weeds when dusted with this dry powder were speedily and effectively destroyed, apparently as effectively if not more so, as when sprayed with a solution.

This result is apparently due to the extraordinary liquescency of the mixture. Each minute particle, upon settling upon some portion of the plant, proceeds forthwith to draw to itself water to such an extent as to become and remain a tiny globule; in other words, a liquid center of chemical activity which proceeds forthwith to poison the plant as a continuous operation until its composition has become entirely absorbed, transformed or exhausted by the process. It is noted that the term alkaline chlorate as employed herein is not intended to refer to its reaction in solution, as its solution may be acid in nature.

The calcium chloride according to these observations exercises contradictory functions and that is its virtue. First, it dries the sodium chlorate. Second, it keeps it dry for a considerable period in a container and in a suitable form for dusting. Third, the instant the powder contacts with organic material, it draws water from both the air and the organic material and avoids fire-hazard. Fourth, it soon draws enough water to dissolve both itself and the associated sodium chlorate. Fifth, upon thus creating a solution, it reacts chemically with the sodium chlorate to form sodium chloride and calcium chlorate; the one being herbicidal to plants not of, and the other being herbicidal to those of, marine ancestry. Sixth, it thereby forms a mixture which itself is deliquescent and hence holds the ingredients in the more or less ionized state and thus best adapted for attacking and poisoning the plants.

When the calcined calcium chloride is thus admixed with sodium chlorate, whether the latter be initially available moist or entirely dry, enough should be taken so that, when subsequently liquefied on the plant, it may react with substantially all the sodium chlorate and convert it into calcium chlorate. In fact, it is preferable, although not absolutely necessary, to employ the calcium chloride in some excess; this excess being desirable as an extra water-drawing factor to ensure an immediate starting of the deliquescence upon dusting the plants. Thus, in commercially compounding my dry powder, I use 1.8 lbs. of sodium chlorate and 1.2 lbs. of calcium chloride; referring to these compounds in the form they are available on the market as technical materials.

Thereby is produced a material which admits of being handled and transported with much less expense than could a concentrated solution. When delivered to the region of usage, it may be easily dissolved in water preparatory to spraying it on the foliage in major operations. Or, for minor operations, where elaborate equipment is unavailable or too expensive, it may with equal if not greater efficiency be simply dusted on the plants.

For the successful handling of any dusting material it is furthermore essential that it shall be, and likewise that it shall remain for a sufficient period, in a dry non-sticky pulverulent form. If too granular, the dry particles when first deposited on leaves will tend to fall off. On the other hand, if they be tacky, the material cannot be dusted without clogging the apertures of the instrumentality employed. It will thus be seen that the requirements are quite complex; dryness being a prime requisite so long as the material is being kept ready for usage and until it has been projected from the duster, yet thereupon wetness becomes a prime requisite the moment the dust contacts with the plant tissue (a) to ensure adhesion, (b) to afford maximum herbicidal activity, and (c) to avoid fire-hazards.

The peculiar properties of calcium chloride in the above described mixture satisfy these desideratums. It is, so to speak, a veritable sponge for water. When quite well dehydrated, as by calcining, it has a porous amorphous structure and may be easily reduced to a fine powder. Its avidity for water enables it to absorb any moisture that may be either possessed or acquired by the sodium chlorate. Yet, in taking up that water, the calcium chloride does not itself exhibit any appearance of dampness at normal temperatures. It is only after it has absorbed about 25% of its weight of water that it begins to become tacky. Sodium chlorate, on the other hand, even when employed as a damp commercial salt, contains but little water; perhaps half a percent on the average. This will be forthwith absorbed by the calcium chloride without in the least affecting its external appearance, and furthermore much more water can be absorbed from the air, when it is exposed, before the mixture will cease to act as a dry pulverulent powder. This is of great consequence from the standpoint of its storage and distribution as a dust.

These observations have led me to a further conception, to wit, the idea of encasing this powder in a can of convenient size for manipulating as a shaker; one end of this can being provided with dusting apertures and having means for keeping them closed except during the period of distribution. I have found that a simple cap and gasket will well answer this purpose.

One would naturally expect, in view of the pronounced deliquescence of the chloride, that much difficulty would be experienced in preventing the dusting vent, or apertures as the case may be, from quickly clogging. As a matter of fact, however, I have ascertained by my experiments that this objection does not obtain. When the user wishes to kill weeds, and the cap is removed it will be found that the apertures are not clogged, and the powder may be shaken through them with ease. Nor will they close up during the operation even if it be leisurely performed throughout a considerable period of time or until the entire contents of the can have been expended. Likewise, a portion of the contents may be distributed and, if the cap be replaced, the can may be kept in reserve for a subsequent operation, and so on until exhausted without materially clogging its apertures.

As will be appreciated, all this greatly simplifies the killing of weeds; especially in minor operations. It entirely avoids the need for an immediate source of water, it avoids the trouble of mixing solutions, it avoids the need for spray devices, it avoids the lifting of heavy water and the spillage of water, it enables the material to be sold in light containers which themselves are self-sufficient as dusters, and it reduces transportation costs.

Should any chlorate of an alkaline-earth base, such as of calcium, magnesium etc., become commercially available as a more or less dry salt, it may be used instead of sodium chlorate in preparing the dry powder. In that case, the amount of the admixed calcium chloride may be less, i. e., in about the proportion of a quarter of a pound of calcined calcium chloride for each two and three-quarters pounds of calcium chlorate.

At the present time, so far as I am aware no chlorate of an alkaline earth base can be purchased in the market, either in a dry or a wet form; except insofar as I alone had been able to make it, as a concentrated solution, by a method contrived by me.

Without success, as yet, I have attempted in a commercially economical way to isolate calcium chlorate in the form of a dry powder. The nearest practicable approach has been as a more or less mixed mushy salt which has resisted all my efforts to extract all of its contained water. By dint of continued experiments, I have made the rather remarkable discovery that, even if this more or less hydrated calcium chlorate be well mixed with granular calcined calcium chloride, in the ratio of about 11:1 then will the latter absorb as much, if not all, of the water in the calcium chlorate to yield a resultant apparently dry mixture. The calcium chloride can itself absorb considerable water before assuming a moist form, and by thus extracting water from the associated calcium chlorate, there results a material which can be readily dried and pulverized.

When using sodium chlorate, as before stated, I have preferred to employ enough calcium chloride to react with substantially all of the sodium chlorate to convert it to calcium chlorate; preferring in fact a little excess of the calcium chloride. When starting with the chlorate of an alkaline-earth base, there is no need of providing for any transformation on the plant but for the best results I prefer to use enough calcium chloride so that about the same excess will be present.

My studies have indicated that calcium chlorate alone is deliquescent but much more so on a hot than on a cold day, whereas calcium chloride is extremely liquescent both hot and cold. A small excess of the latter is for that reason desirable, in addition to its powder-drying characteristic, for thereby it is instrumental in expediting the herbicidal reaction as soon as contact with the plant has been established; as well on cold as on hot days.

In lieu of calcined calcium chloride, there may be used any other compatible dry powder having the property of absorbing an appreciable amount of water before becoming moist in physical effect, such as another deliquescent mineral salt as magnesium chloride.

The term calcined wherever employed by me has been used to indicate that the salt has been freed from water in any suitable manner insofar as is necessary to convert it into a physical state such that it not only exhibits the appearance of dryness but also has a capacity for absorbing a considerable quantity of water before losing its free flowing pulverulent characteristics. In other words, the calcium chloride may have been only so far dehydrated that, upon absorbing 10% of its weight of water, it will become tacky. Or it may be more completely dehydrated and thus capable of absorbing 15% or 20% etc. without apparent change.

In any event, it should be sufficiently dehydrated to be able (a) to absorb enough water from its associated salt to dry it and keep it dry within the container. (b) to absorb such moisture as may be in the air within the container, and (c) to continue to absorb water from the air admitted, whenever the cap is removed on the one or more occasions of usage, so that the herbicidal powder may be kept as a dustable powder until and during projection from the duster.

I claim:

1. The method of killing weeds which consists in dusting them with an initially dried deliquescent agent adapted upon contact with plant tissue to absorb water to form an herbicidal solution.

2. A process of killing weeds which consists in dusting them with a powder comprising a water-soluble chlorate admixed with the pre-dried chloride of an alkaline-earth base.

3. An herbicidal powder adapted to be dusted on plants which is composed of a mixture of a chlorate with the calcined chloride of an alkaline-earth base.

4. The art of killing weeds which consists in dusting them with a deliquescent mixture of an alkaline chlorate with an alkaline-earth chloride; the latter being initially dehydrated to a considerable extent and employed in a quantity sufficient to deliquesce into a solution of the plant capable of dissolving the chlorate.

5. The art of killing weeds which consists of dusting them with an intimate pulverulent mixture of an alkaline chlorate with a dehydrated deliquescent chloride.

6. A process of killing weeds which consists in dusting them with a dry powdered mixture of an alkaline chlorate with a dehydrated chloride of an alkaline-earth.

7. A process of killing weeds which consists in dusting them with a dry powdered mixture of an alkaline-earth chlorate with a dehydrated chloride of an alkaline-earth base.

8. A non-caking weed-killing powder which will liquefy when applied to weeds comprised of an intimate mixture of a dry water soluble chlorate and a dehydrated deliquescent chloride.

9. An herbicidal powder consisting of a mixture of a dry alkaline chlorate with a substantial proportion of a dehydrated deliquescent chloride.

10. An herbicidal powder consisting of a mixture of a dry alkaline-earth chlorate with a substantial proportion of a dehydrated deliquescent chloride.

11. A weed killing substance consisting of a mixture in powdered form of dry sodium chlorate and a dehydrated deliquescent chloride.

12. A dustable herbicidal powder consisting of a dry pulverulent mixture of a chlorate with a compatible dehydrated agent of a highly deliquescent nature.

13. An herbicidal powder consisting of an intimate mixture of a dry alkaline chlorate with a dehydrated chloride of an alkaline-earth base.

14. An herbicidal powder consisting of a dry pulverulent mixture of an alkaline-earth chlorate with a dehydrated chloride of an alkaline-earth.

In witness whereof, I hereunto subscribe my name.

RALPH N. CHIPMAN.